United States Patent
Kawamura et al.

[11] Patent Number: 6,046,442
[45] Date of Patent: Apr. 4, 2000

[54] TEMPERATURE CONTROLLER OF ELECTROMAGNETIC INDUCTION HEATER AND ITS START SYSTEM

[75] Inventors: Yasuzo Kawamura; Yoshitaka Uchihori, both of Ibaraki, Japan

[73] Assignee: Kabushiki Kaisha Seta Giken, Osaka, Japan

[21] Appl. No.: 09/043,372

[22] PCT Filed: Sep. 17, 1996

[86] PCT No.: PCT/JP96/02665

§ 371 Date: Sep. 11, 1998

§ 102(e) Date: Sep. 11, 1998

[87] PCT Pub. No.: WO97/11578

PCT Pub. Date: Mar. 27, 1997

[30] Foreign Application Priority Data

Sep. 18, 1995 [JP] Japan .................................. H7-264771

[51] Int. Cl.[7] ...................................................... H05B 6/08
[52] U.S. Cl. ........................... 219/667; 219/630; 219/428
[58] Field of Search ..................................... 219/663, 664, 219/665, 667, 630, 676, 628, 629, 482

[56] References Cited

U.S. PATENT DOCUMENTS

| | | | |
|---|---|---|---|
| 2,644,881 | 7/1953 | Schörg | 219/47 |
| 4,764,652 | 8/1988 | Lee | 219/662 |
| 4,795,886 | 1/1989 | Carter, Jr. | 219/505 |
| 4,810,847 | 3/1989 | Ito | 219/665 |
| 4,855,552 | 8/1989 | Marceau et al. | 219/630 |
| 5,010,223 | 4/1991 | Kim | 219/626 |
| 5,329,100 | 7/1994 | Lee | 219/626 |
| 5,434,389 | 7/1995 | Griebel | 219/663 |

FOREIGN PATENT DOCUMENTS

| | | |
|---|---|---|
| 1 253 556 | 5/1989 | Canada . |
| 0 404 209 A1 | 12/1990 | European Pat. Off. . |
| 62-291891 | 12/1987 | Japan . |
| 7-35413 | 2/1995 | Japan . |

OTHER PUBLICATIONS

Microfilm of the specification and drawings annexed to the written application of Japanese Utility Model Application No. 19214/1990 (Laid–open No. 110790/1991) (Tokin Corp.), Nov. 13, 1991, p. 5, line 17 to p. 8, line 5; Figs. 1 to 4.

Microfilm of the specification and drawings annexed to the written application of Japanese Utility Model Application No. 20267/1990 (Laid–open No. 110791/1991) (Tokin Corp.), Nov. 13, 1991, p. 5, line 2 to p. 6, line 19; Figs. 1 to 4.

Dede E.J., et al.: "On the Design of Medium and High Power Current Fed Inverters for Induction Heating," proceedings of the Industry Applications Society Annual Meeting, Dearborn, Sep. 28, –Oct. 1, 1991, vol. 1, Jan. 1, 1991, Insttitue of Electrical and Electronics Engineers, pp. 1047–1053.

*Primary Examiner*—John A. Jeffery
*Assistant Examiner*—Jeffrey Pwu
*Attorney, Agent, or Firm*—Morrison & Foerster LLP

[57] ABSTRACT

The present invention relates to a temperature controller used for an electromagnetic induction heating apparatus provided with a heating element made of magnetic material, and prepared in a fluid passage. A coil is prepared in the perimeter of the heating element and a high frequency electric current generator for the coil. The temperature controller comprises an electric current detection unit measuring the electric current flowing from the high frequency electric current generator to the coil and detecting that the temperature of magnetic material forming the heating element reaches in the vicinity of the magnetic transformation temperature, and an electric current restrictive unit limiting the electric current flowing to the coil based on the electric current detection unit. When the temperature of the heating element reaches in the vicinity of the magnetic transformation temperature, the electric current detection unit detects the rising electric current and the electric current restrictive unit limits the further rising electric current.

12 Claims, 7 Drawing Sheets

TEMPERATURE CONTROLLER OF ELECTROMAGNETIC INDUCTION HEATER AND ITS START SYSTEM

TECHNICAL FIELD

This invention relates to a temperature controller and an starting method of an electromagnetic induction heating apparatus which possesses a heating element made of magnetic material to a temperature controller and starting method to heat and start the electromagnetic induction heating apparatus without a magnetic transformation of the heating element made of magnetic material.

BACKGROUND OF ART

A construction of a prior example concerning such kind of an electromagnetic induction heating apparatus will be described based on FIG. 6.

The electromagnetic induction heating apparatus comprises a pipe 11 formed of an insulator, a heating element 12 in a fluid introduced in the pipe 11 and a coil 13 rolled around the pipe 11, and generates heat by an electromagnetic induction caused between the heating element 12 and the coil 13. A high frequency inverter 5 with a sensorless high power factor is used as the high frequency electric current generator for making an alternating field on the coil 13. A controller 3 controls an output of the high frequency electric current generator, which includes a phase shift controling device 3a and a gate driver 3b. A temperature sensor 17 is fixed on the side of outlet of the pipe 11. A temperature regulator 2 is connected with the phase shift controling device 3a. In addition, the high frequency electric current generator includes a rectification section 22 for an alternating current power supply 21, a non-smoothing filter 23 and an inverting section 24.

Normal functions of the above mentioned electromagnetic induction heating apparatus will be described. At the time of ordinary running, a low-temperature fluid 14 is supplied from a lower side of the pipe 11. The low-temperature fluid 14 turns into a fluid 15 of the turbulent flow within the heating element 12. The fluid 15 of the turbulent flow directly exchanges heat with the heating element 12 and turns into a high-temperature fluid.

The high-temperature fluid is discharged from an upper side of the pipe 11. A temperature of the high-temperature fluid is measured by the temperature sensor 17. An instruction corresponding to a difference between the high-temperature fluid and a required temperature is output from the temperature regulator 2 to the phase shift controling device 3a. The instruction is input in the high frequency electric current generator 5 through the gate driver 3b. Then, an electric current from the high frequency electric current generator 5 is appropriately controlled. According to the direct heating type of the electromagnetic induction heating apparatus 1, a high heat conductive efficiency is achieved by making heat conductive areas of the heating elements 12 large. Hence, the time when temperature raises up till a required temperature can be shortened. In other words, a starting-up time for starting heating at the required temperature can be shortened.

The heating element 12 generates heat itself by electromagnetic induction then heats up a fluid directly. Therefore, special material is used for the heating element 12. The material of the heating element required to be a ferromagnet for generating heat by electromagnetic induction, and, to be efficient in corrosion resistance since it directly contacts with the fluid. As the material which satisfies the above conditions, there is a stainless steel of martensite group which has Cr,Fe as the principal ingredient and is proposed in a patent application No. H6-297287.

In order to further shorten the starting-up time for starting heating at the required temperature, it is proposed to heat the entire electromagnetic induction heating apparatus in advance. In this regard a fluid is filled in a pipe 11, and a heating element 12, a temperature sensor 17 and so on are in the fluid. The pipe 11, the heating element 12 and the fluid are preheated when the high frequency electric current generator 5 operates.

A significant difference results between a fluid temperature detected by the temperature sensor 17 and a real temperature of the heating element, since the fluid does not flow in the pipe 11 during the preheating. Also, an excessive electric current has been flowing into the high frequency electric current generator 5 in spite of the real temperature of the heating element 12 rising up more than the required temperature. Consequently, the electromagnetic induction heating apparatus is damaged.

A heating system which includes the coil 13 and the heating element 12, can be shown by a model of a transformer circuit whose leakage inductance is large, and can be displayed in a simple R-L circuit which includes L1 and R1. In the R-L circuit, an equivalent resistance of the R-L circuit is defined by R, a specific resistance of the R-L circuit is defined by r, an electric current of the R-L circuit is defined by $I_C$ and an electric power of the R-L circuit is defined by $P_0$. FIG. 7 illustrates how the R,r,$I_C$ and $P_0$ change with the change concerning the temperature of the heating element 12.

In FIG. 7, the specific resistance r rises when the temperature increases while the equivalent resistance suddenly decreases from a certain temperature $T_0$. Accordingly, the electric current $I_C$ and the electric power $P_0$ turn to increase from the certain temperature $T_0$. When the electric current $I_C$ and the electric power $P_0$ increase to excess of and surpass a rating, some electric power elements of the high frequency electric current generator 5 are damaged. This phenomenon occurs as follows. Temperature of the heating element 12 becomes high and reaches a magnetic transformation temperature of the magnetic material forming the heating element 12. In other words, when the temperature of the heating element 12 reaches the magnetic transformation temperature $T_0$ of the magnetic material forming the heating element 12, a magnetism of the heating element 12 suddenly changes from ferromagnetic to paramagnetic. Consequently, the coil 13 becomes a short circuit condition.

Therefore, it is proposed that a chemical composition of the heating element 12 be changed so as to shift the magnetic transformation temperature $T_0$ to a high-temperature side. However, when the chemical composition of the heating element 12 is changed, a new problem occurs in that the corrosion resistance of the heating element 12 gets worse. Moreover, the temperature sensor 17 does not directly detect the temperature of the heating element 12 and detects the temperature of the fluid which has exchanged heat with the heating element 12. Accordingly, a reckless driving of the high frequency electric current generator 5 can not be avoided when the fluid 14 is heated without any stream of the fluid 14.

SUMMARY OF THE INVENTION

It is an object of the present invention to provide a temperature controller of an electromagnetic induction heating apparatus, wherein a high frequency electric current generator does not drive recklessly even when a temperature of a heating element reaches in the vicinity of a magnetic transformation temperature.

Another object for an the present invention is to provide a starting method of electromagnetic induction heating apparatus, wherein an electric current is limited and a static fluid is preheated, a zero-starting is performed even when a temperature of a heating element reaches in the vicinity of a magnetic transformation temperature. Zero-starting means that a fluid can be heated at a required temperature from a start of heating, and the start of heating is the time when the fluid starts flowing through a pipe of an electromagnetic induction heating apparatus.

The temperature controller of the present invention is used for an electromagnetic induction heating apparatus provided with a heating element made of magnetic material and prepared in a fluid passage of a coil prepared in the perimeter of the heating element and a high frequency electric current generator for the coil. The electromagnetic induction heating apparatus has a magnetic transformation temperature, where a degree of magnetism suddenly decreases when magnetic material of the heating element becomes high-temperature.

In order to achieve the aforementioned object, the temperature controller of the present invention comprises an electric current detection means for measuring the electric current flowing from the high frequency electric current generator to the coil, and detecting that the temperature of magnetic material forming the heating element reaches in the vicinity of the magnetic transformation temperature, and an electric current restrictive means for limiting the electric current flowing to the coil based on the electric current detection means.

When the temperature of the heating element reaches in the vicinity of the magnetic transformation temperature, an equivalent resistance becomes small, then an electric current value rises. At that time, according to the present invention of the temperature controller, the electric current detection means detects the rising electric current and the electric current restrictive means limits the further rising electric current after reaching in the vicinity of the magnetic transformation temperature.

One electric current restrictive means makes an output of the high frequency electric current generator down when the electric current flowing through the coil reaches a required value and makes the output of the high frequency electric current generator up again when the heating element is cooled. Thus, the electric current restrictive means limits the electric current to repeat the above actions. In this case, a heat transmission from the heating element to the static fluid is performed when the heating element generates heat by electromagnetic induction or when the electric current stops. By a repetition of the heat transmission like the above, a rise of excessive temperature of a heating element is restrained and the static fluid is heated up.

Moreover, other electric current restrictive means maintains a required value of an electric current when the value of the electric current flowing through the coil reaches the required value. In this case, a static fluid is heated up while heat generation of the heating element, according to electromagnetic induction, is limited by the electric current restrictive means.

The present invention of a starting method is used for an electromagnetic induction heating apparatus provided with a heating element made of magnetic material and prepared in a fluid passage, a coil prepared in perimeter of the heating element, a high frequency electric current generator for the coil and a temperature regulator for measuring a fluid temperature at the side of outlet of the fluid passage and adjusting an output of the high frequency electric current generator. The electromagnetic induction heating apparatus has a magnetic transformation temperature where a degree of magnetism suddenly decreases when magnetic material of the heating element becomes high-temperature.

In order to achieve the aforementioned object, the starting method of the invention comprises the following:

① filling the fluid passage with the fluid so as to keep the heating element in the static fluid, ② flowing the electric current from the high frequency electric current generator to the coil to set a required temperature in the temperature regulator, ③ preheating the heating element and the fluid with limiting the electric current and taking precedence of an instruction of the temperature regulator when a temperature of the magnetic material forming the heating element reaches in the vicinity of a magnetic transformation and the electric current flowing through the coil increases, and ④ starting the electromagnetic induction heating apparatus to flow out the fluid from the fluid passage.

Even when the electric current flows from the high frequency electric current generator to the coil after the required temperature is set in the temperature regulator, the temperature regulator for measuring the fluid temperature at the side of outlet of the fluid passage and adjusting the output of the high frequency electric current generator can not always detect a rise of the temperature of the fluid. Accordingly, the output of the high frequency electric current generator can not be adjusted appropriately. Therefore, the magnetic transformation of the heating element is evaded and the static fluid is preheated by the above process for preheating the heating element and the fluid with limiting the electric current and taking precedence of an instruction of the temperature regulator when a temperature of the magnetic material forming the heating element reaches in the vicinity of a magnetic transformation and the electric current flowing through the coil. When the fluid flows out after the preheating, the fluid can be heated at a required temperature from a start of heating and the temperature regulator performs appropriately. Consequently, the zero-starting can be achieved.

DETAILED DESCRIPTION OF THE PRESENT INVENTION

Figure 1:
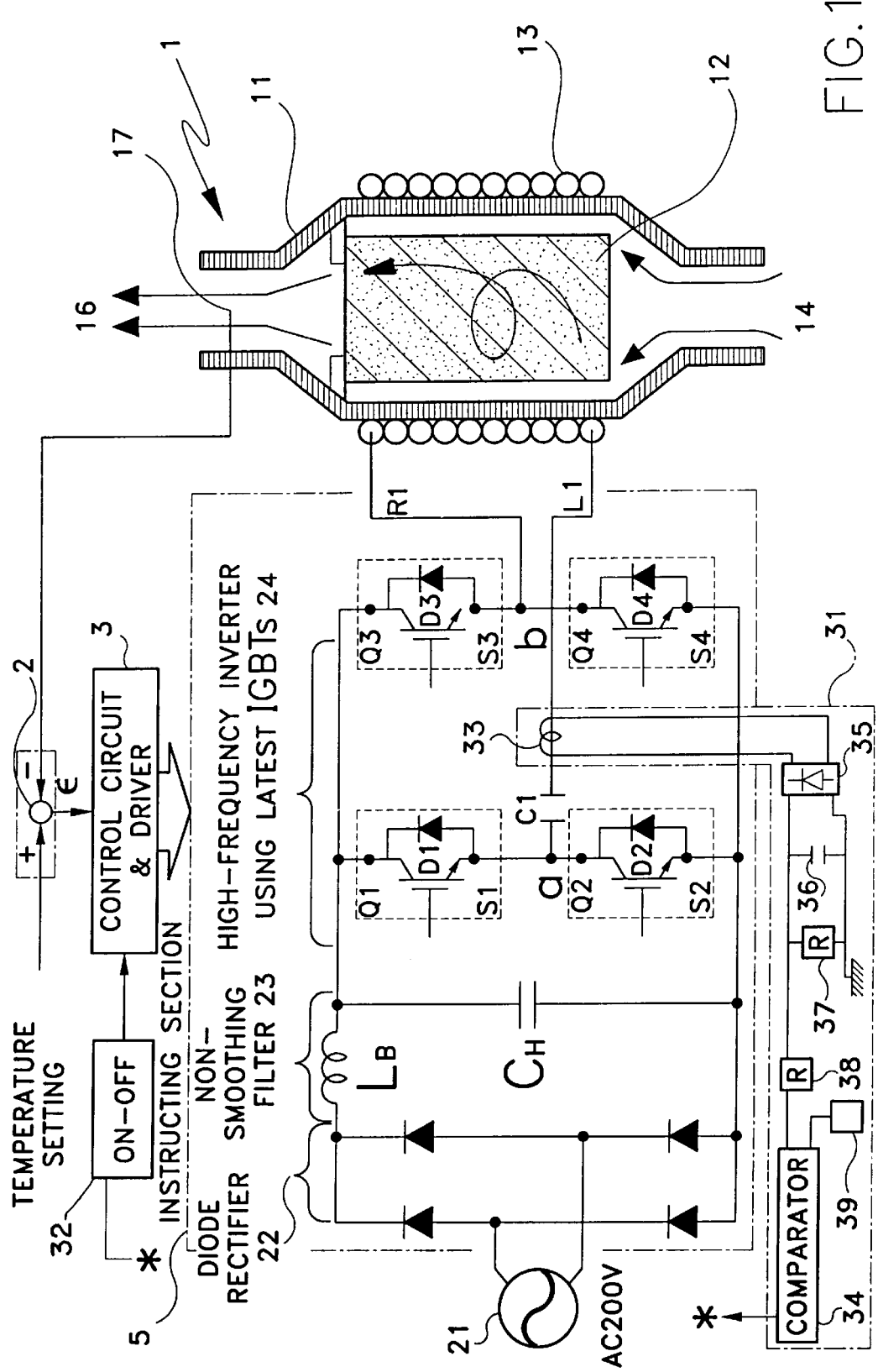
FIG. 1 shows a structural chart of an electromagnetic induction heating apparatus and a temperature controller of an exemplary embodiment of the present invention

A detailed description of the present invention, will be explained below with reference to the drawings. FIG. 1 shows a structural chart of an electromagnetic induction heating apparatus and a temperature controler concerning the present invention.

A main body 1 of the electromagnetic induction heating apparatus is provided with a pipe 11 made of nonmetal and forming a fluid passage, a heating element 12 (the heating element is in a fluid such as liquid or gas and heated by electromagnetic induction heating; the fluid is directly heated up by the heating element.) accommodated within the pipe 11 and a coil 13 wound round an external circumference of the pipe 11. A low-temperature fluid 14 enters the pipe 11 from a lower side of the pipe 11 and passes through the inside of heating element 12 then turns into a mixed fluid. Consequently, the fluid 14 is uniformly heated. The high-temperature fluid 16 flows out from an upper outlet of the pipe 11. A temperature of the high-temperature fluid 16 is detected by a temperature sensor 17. The temperature sensor 17 is connected with a temperature regulator 2.

A high frequency electric current generator 5 comprises a rectifier 22 for an AC power supply 21, a non-smoothing filter 23 and a inverting section 24. The output of the high frequency electric current generator 5 is controlled by an electric current controling section 3 including a phase-shift controling device and the gate driver.

A heating system consisting of the coil 13 connected with the inverting section 24 and the heating element 12 made of an electrical conductive metal can be represented by a transformer circuit model having a large leakage inductance regarding as a simplified R-L circuit having $L_1$ and $R_1$. When a compensating capacitor $C_1$ is connected with the R-L circuit in series, the heating system can be taken as a non-time-dependent circuit system whose electric circuit constant is nearly fixed. Therefore, it is easy to establish synchronization which compensates for L of an R-L load system by the resonance capacitor C1. This permits an optimum circuit design for working frequency and the resonance capacitor C1.

The high-frequency inverting section 24 has four switching elements Q1 to Q4. Specifically, Q1 and Q2 are connected in series, Q3 and Q4 are connected in series and the former and the latter are connected in parallel. The switching elements Q1 to Q4 are expressed by a circuit diagram where switches S1 to S4 and diodes D1 to D4 are connected in parallel, and are formed by using semiconductor power devices such as SIT (Static Induction Transistor), B-SIT, MOSFET (Metal-Oxide Semiconductor FET), IGBT, MCT and the like.

When the switches S1, S4 are closed, the current flows to the circuit from point "a" to point "b" through loads L1, R1. When switches S2, S3 are closed, the current flows to the circuit from the point "b" to the point "a" through the loads L1, R1. That is, as viewed from the loads L1, R1, the current flows in order or in reverse order. Each of the switches S1 to S4 drives at a voltage pulse of a little less than 50% duty cycle.

The voltage drive pulse of the switches Si, S2 is referred to as reference phase pulse, and that of the switches S3, S4 is referred to as control phase pulse. By varying a phase difference φ between the reference phase and the control phase continuously from 0 to 180° C., it is able to control output voltage (PWM; Pulse Width Modulation).

Theorectically, the output power can be varied continuously from 0 to the maximum output that is determined by load circuit constant and inverter working frequency.

A temperature controller which is employed by the above said electromagnetic induction heating apparatus, comprises an electric current detection means 31 for measuring an electric current flowing from the high frequency electric current generator 5 to the coil 13 and detecting that a temperature of a magnetic material forming the heating element 12 reaches in the vicinity of a magnetic transformation, and an electric current restrictive means 32 for limiting the electric current flowing through the coil 13 based on the electric current detection means.

The electric current detection means 31 is prepared at the right place of the circuit from the point a to the point b in the inverting section 24 and possesses a measuring section 33 for measuring an electric current flowing through the circuit and a comparator 34 for converting the current value into a voltage value and comparing the voltage value with a required value. Here, a numeral 35 shows a rectifier, a numeral 36 shows a by-pass condenser, a numeral 37 shows a parallel resistance and a numeral 38 shows a serial resistance. By these devices, the current value is converted into the voltage value able to be input into the comparator 34. In the comparator 34, the voltage value is compared with a required standard voltage output from a standard voltage generator 39. When the voltage value is bigger than the standard voltage, the comparator 34 outputs an ON-signal.

The electric current restrictive means 32 includes of an ON-OFF instructing section which is a timer built-in type and connected with the electric current controling section 3. When the ON-OFF instructing section 32 receives the ON-signal output from the comparator 34, the ON-OFF instructing section 32 issues an instruction of a zero output toward the electric current controling section 3. The phase shift controling device of the electric current controling section 3 makes the phase difference φ of a drive pulse voltage between the standard phase and the control phase into zero. Thus, an output voltage of the high frequency electric current generator 5 is made into zero or nearly zero. Then, the timer of the ON-OFF instructing section 32 counts up during a required time. Afterward, the electric current controling section 3 returns to the ordinary condition in which the electric current controling section 3 is controlled by the temperature regulator 2.

Figure 2:
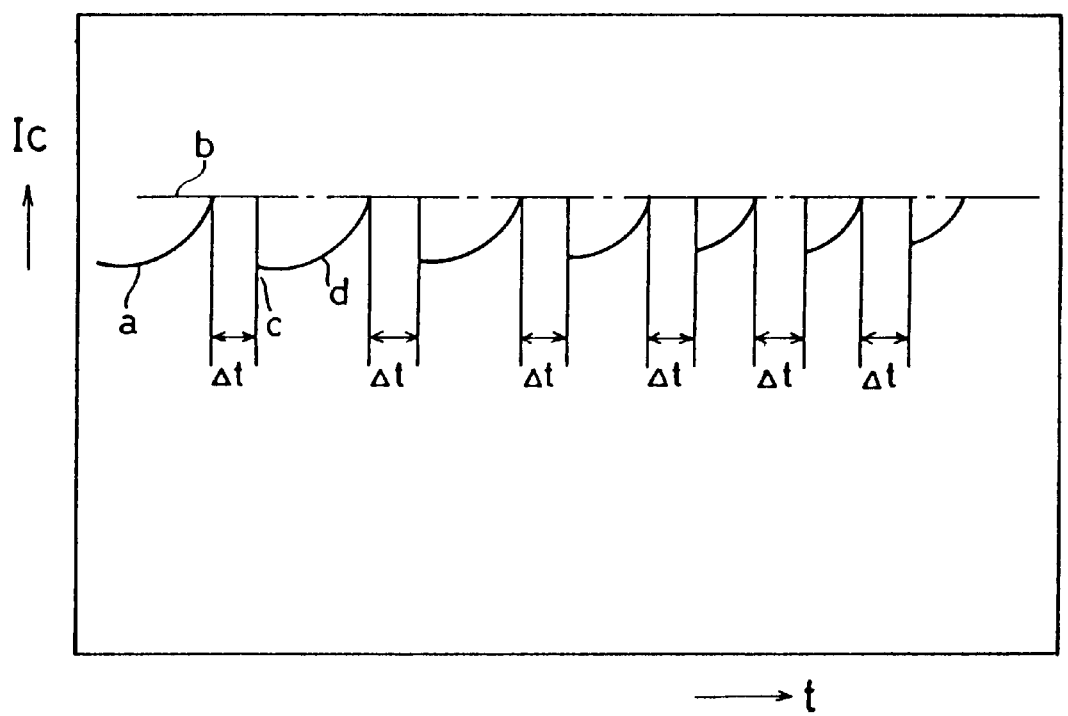
FIG. 2 shows an exemplary operation chart of the temperature controller

Next, a starting method of the present invention will be explained using the above said temperature controller based on the FIG. 1 and FIG. 2. In the electromagnetic induction heating apparatus shown in FIG. 1, a fluid 14 is introduced within the pipe 11 of the main body 1 and a liquid level of the fluid 14 is lifted up till the temperature sensor 17 is in the fluid 14 then the condition is maintained. In the temperature regulator 2, a desired temperature is established.

When the high frequency electric current generator 5 starts operations, the phase shift controling device 3a of the controling section 3 outputs an instruction of output voltage 100% since an output from the temperature sensor 17 is low. When they temperature of the heating element 12 rises, a temperature of the fluid in contact with the heating element 12 rises by heat transmission from the heating element 12. However, heat transmission in a whole of the fluid is performed only by a spontaneous convection since the fluid is in static state. Accordingly, the heat transmission is not efficient, and the temperature of the heating element 12 further rises. When SUS 447J1 which is stainless steel of martensite group is used as a material of the heating element 12, there is a magnetic transformation in the vicinity of 600–700° C. When the temperature of the heating element 12 becomes in the vicinity of 500° C., the electric current flowing through the coil 13 increases rapidly.

In the measuring section 33, the increased electric current is measured and the current value is converted into the voltage value. In the comparator 34, the voltage value is compared with a required standard voltage In FIG. 2, a curve a shows a current value curve $I_C$ flowing through the coil 13. When the temperature of the heating element 12 approaches the magnetic transformation temperature, the current value $I_C$ suddenly rises. When the current value $I_C$ flowing through the coil 13 exceeds the required value b determined by the material of the heating element 12, the ON-OFF instructing section 32 of the electric current restrictive means operates and an instruction of zero-output is output from the controling section 3 to the high frequency electric current generator 5.

Consequently, the flow of the electric current stops and the heating element does not generate heat. The heating element 12 is cooled by the heat transmission with the fluid during a time Δt preset in the ON-OFF instructing section 32. When the high frequency electric current generator 5 starts operations after the time Δt, the current value is low since the heating element 12 is cooled. When it 5 starts operations again at c point, the temperature of the heating element 12 reaches in the vicinity of the magnetic transformation temperature again and suddenly the electric current value rises and reaches the required value b. By a repetition of the above, i.e. by the low-temperature and high-temperature are repeated, the static fluid, the pipe 11 and so on are preheated without further rising from in the vicinity of the magnetic transformation temperature.

In addition, liquid is employed as the fluid to be heated in mentioning above explanation concerning the starting method which can perform the zero-starting, gas can be used and employed as the fluid to be heated as well. For example, when hydrogen is heated up, nitrogen of inert gas is filled into a heating system including an electromagnetic induction heating apparatus before heating. After preheating of the nitrogen of inert gas and the electromagnetic induction heating apparatus, hydrogen to be heated flows through the electromagnetic induction heating apparatus so as to flow out nitrogen of inert gas. Therefore, it is not necessary that the fluid to be preheated coincides with the fluid to be heated after preheating. Also, when liquid is heated up, nitrogen or air may be filled into the electromagnetic induction heating apparatus before heating. After preheating of the nitrogen or air and the electromagnetic induction heating apparatus, liquid to be heated flows through the electromagnetic induction heating apparatus so as to flow out nitrogen or air. In this case, also, the fluid to be preheated does not coincide with the fluid to be heated after preheating. However, these cases coincide with each other as for some points that some fluid has filled with the electromagnetic induction heating apparatus at the time of preheating and the preheated fluid has pushed out it after preheating.

Figure 3:
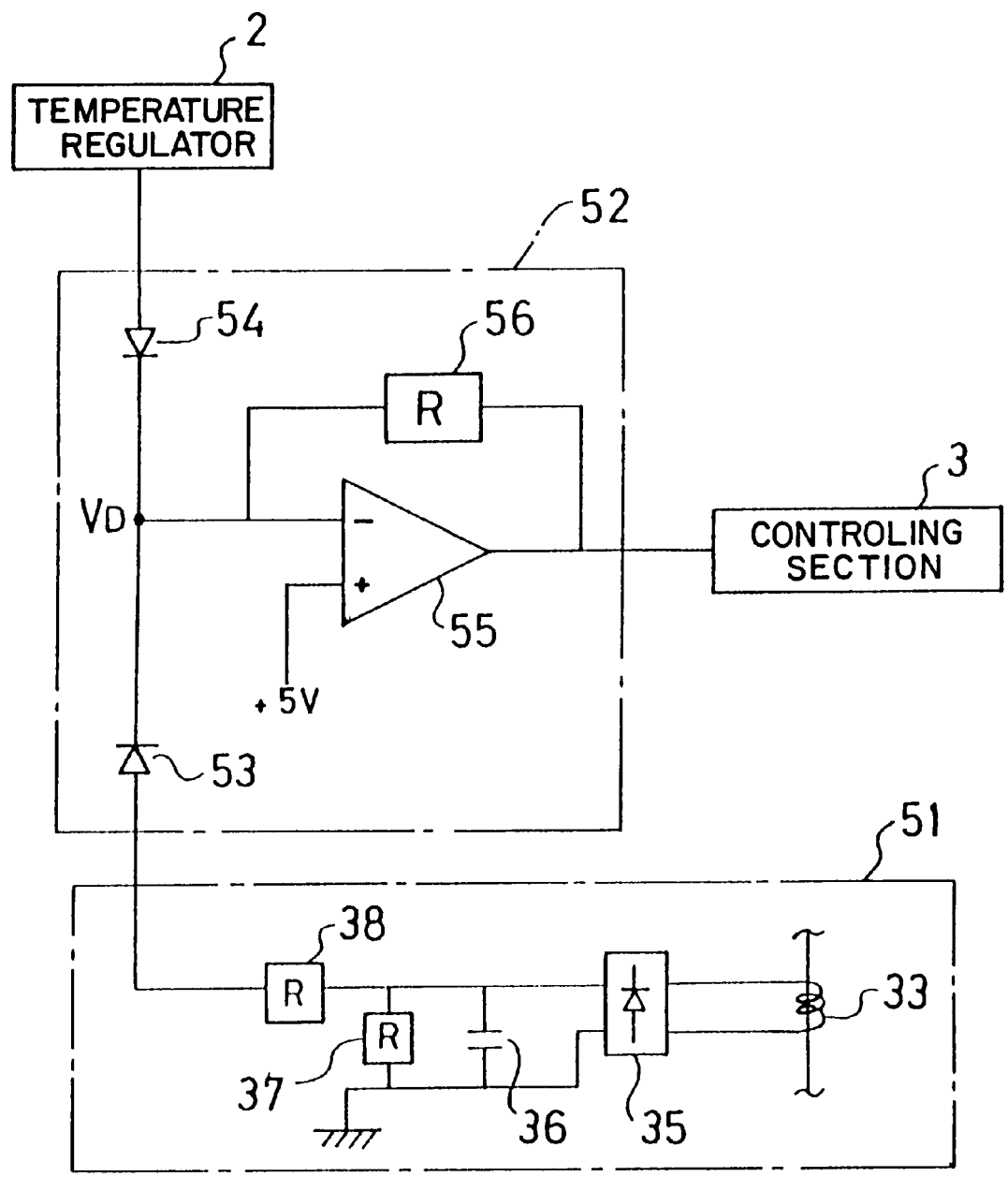
FIG. 3 shows an exemplary block diagram of another exemplary embodiment of a temperature controller of the present invention

FIG. 3 shows another exemplary embodiment of a temperature controller. The other temperature controller also comprises an electric current detection means 51 including an electric current measuring section 33 prepared in the circuit connected with a coil 13, a rectifier 35, a by-pass condenser 36, a parallel resistance 37 and a serial resistance 38 as well as FIG. 1. Between a temperature regulator 2 and a controlling section 3, an electric current restrictive means 52 is prepared, which operates to receive an output from the electric current detection means 51. The electric current restrictive means 52 possesses, as the main parts, diodes 53,54 for choosing a higher rank between a voltage from the electric current detection means 51 or a voltage from the temperature regulator, a comparator 55 for comparing a voltage at Vd point with a required voltage, for example 5 V, and a parallel resistance 56 to the comparator 55.

The electric current restrictive means 52 operates as follows. For example, when an output of Vd point is 5 V, the comparator 55 gives an instruction of a maximum output for the controling section 3. When the output of Vd point is 10 V, the comparator 55 gives an instruction of a minimal output for the controling section 3. Therefore, even though the temperature regulator 2 outputs 5 V, when the electric current detection means 51 outputs 10 V, this 10 V is chosen as the output to the comparator 55. The comparator 55 gives the instruction of the minimal output for the controling section 3.

Figure 4:
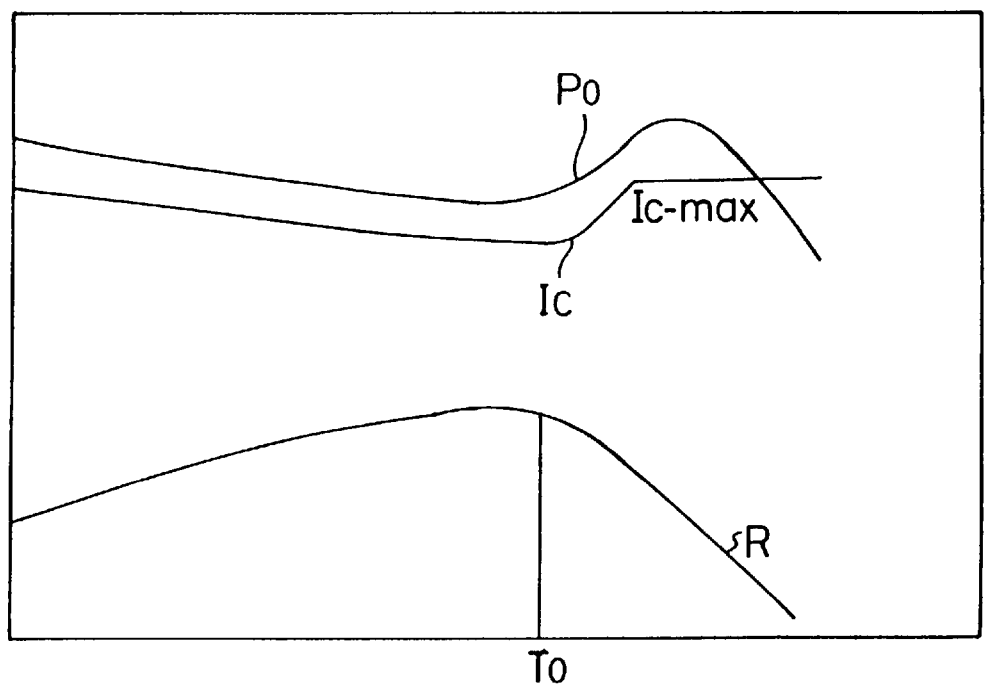
FIG. 4 shows an exemplary operation chart of the temperature controller of FIG. 3

As a result, as shown in FIG. 4, even though the temperature of the heating element 12 reaches in the vicinity of the magnetic transformation temperature and an electric current value begins rising, the electric current value does not exceed the required electric current value $I_C$-max. An output electric power $P_0$ is also gradually decreased. Accordingly, heated temperature of the fluid due to the heating element 12 is maintained in the vicinity of the magnetic transformation temperature $T_0$. In addition, a starting method of an electromagnetic induction heating apparatus employing the temperature controller shown in FIG. 3 is similar to the starting method of FIG. 1.

Figure 5A:
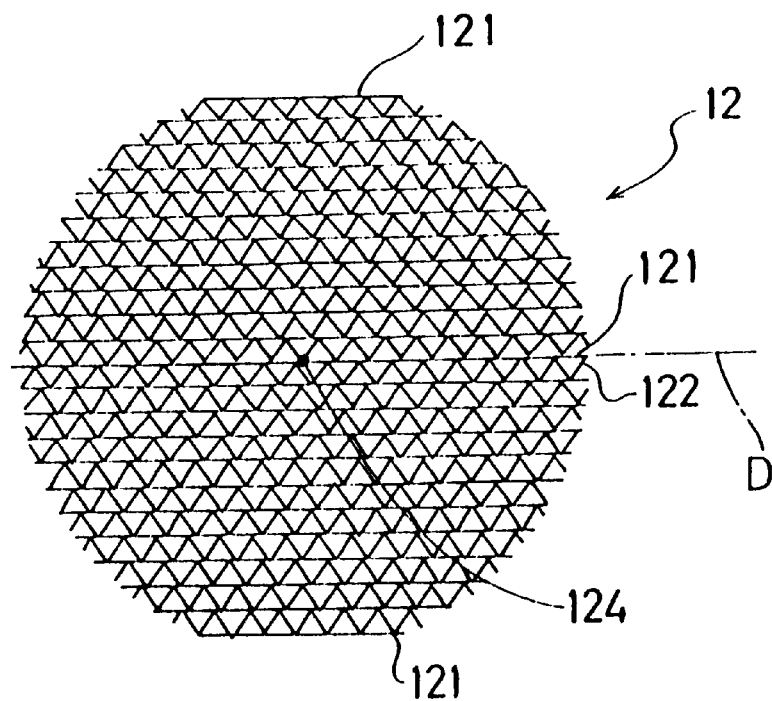
FIG. 5(a) shows an exemplary construction chart of a heating element
Figure 5B:
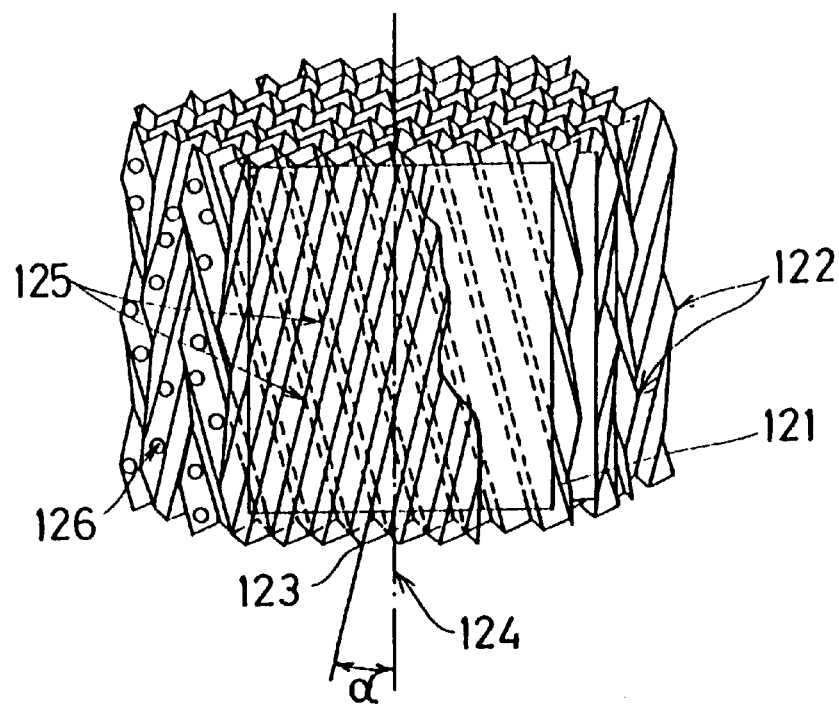
FIG. 5(b) shows an exemplary construction chart of a heating element.
Figure 6:
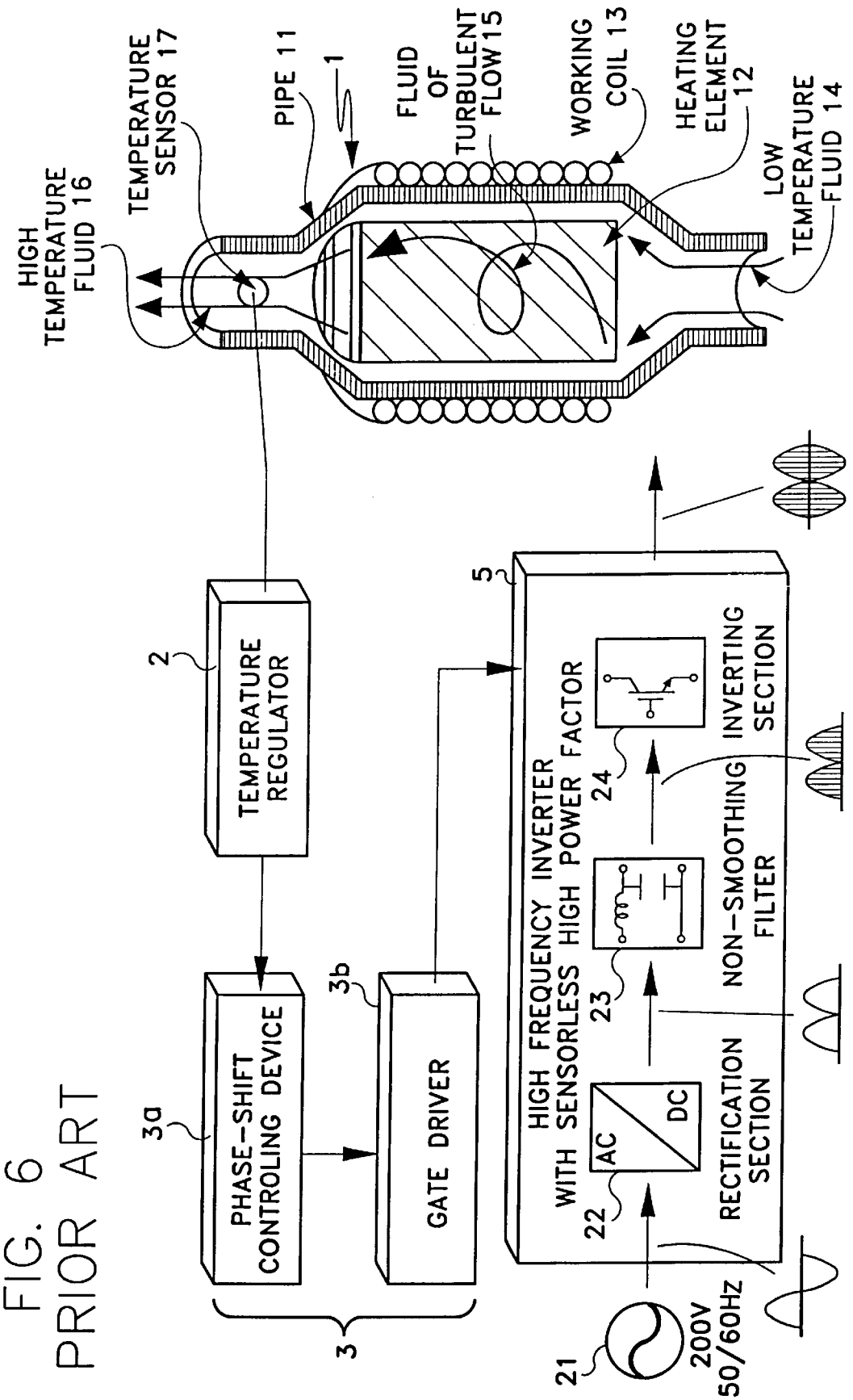
FIG. 6 shows a structural chart of an electromagnetic induction heating apparatus and a temperature controller of the prior art
Figure 7:
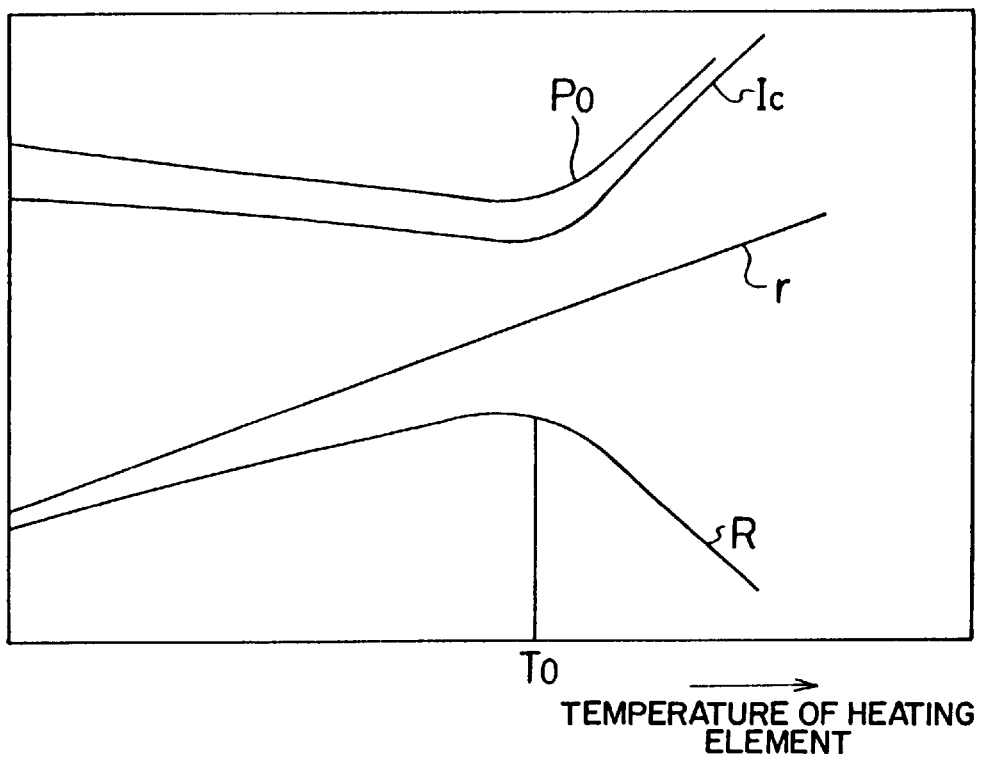
FIG. 7 shows an operation chart of the prior temperature controller.

Next, a desirable embodiment of the heating element 12 will be explained based on FIG. 5(a) and FIG. 5(b). FIG. 5(a) is a a top view showing a an exemplary construction of the heating element, and FIG. 5(b) is a perspective view showing the structure of the heating element. The heating element 12 is formed into a cylindrical column shape as a whole, with plate-like first sheet materials 121 and corrugated second sheet materials 122 laminated alternately and also the first sheet materials 21 positioned at both ends of the side surfaces. When the heating element 12 is such a regular filler material as is formed into the multilayer laminate, the area connected with a static fluid before starting becomes large and a heat transmission time from the heating element 12 to the static fluid becomes short. Therefore, the heating element 12 is suitable for the starting method of the present invention able to perform the zero-starting. In addition, the heating element 12 can heat up the fluid uniformly. The construction of the heating element 12 will be explained below.

The second sheet materials 122 are arranged so that their wave crests (or wave troughs) 123 can be just slanted at an angle α with respect to the center axis 24 and the wave crests (or troughs) 123 of the adjoining second sheet materials 122 are intersected each other through the first sheet materials 121. At the intersecting points 125 of the crests (or troughs) 23 of the adjoining second sheet materials 122, the first sheet materials 121 and the second sheet materials 122 are welded by spot welding so as to conduct an electricity. The second sheet materials 122 have, on their surfaces, holes 126 for causing turbulent flow of the fluid 14. In place of or in addition to the holes 126, satinizing may be effectively given to the first sheet materials 121 and/or the second sheet material 122 in order to roughen the surfaces of the same. In short, the first sheet materials 121 and the second sheet materials 122 are arranged so as to be substantially parallel to each other in a direction of the diameter D passed through by the center axis 124 of the heating element 12 so that electric flow can be most facilitated in a direction along the sheet materials 121,122 of a plane formed by the diameter D (a transverse direction of the circumferential direction ). Then, a skin effect (a state in which only an outer periphery of the heating element 12 is heated) appearing in the electromagnetic induction is broken so as to heat the interior of the heating element 12. The example of a heating element of which central part is heated, is not limited by the laminate of the sheet materials 121,122. A multitudinous small-diameter pipes may be made together and molded as a heating element. In this case, each surface of the small-diameter pipes is heated then the uniform heating becomes possible as the whole.

As the above explanation, in the temperature controller of an electromagnetic induction heating apparatus concerning the present invention, the electric current flowing through the high frequency electric current generator is limited by the electric current restrictive means even though the temperature of the heating element reaches in the vicinity of the magnetic transformation temperature. Therefore, even though the temperature regulator does not work such as in the case of heating a static fluid, it is possible to heat at a high-temperature without a reckless drive of the high frequency electric current generator. A starting method of electromagnetic induction heating apparatus concerning the present invention enables a zero-starting to be performed by filling the electromagnetic induction heating apparatus with a static fluid and preheating the static fluid. Hereon, the zero-starting means that a fluid can be heated at a required temperature from a start of heating and the start of heating is the time when the fluid to be heated starts flowing through a pipe of an electromagnetic induction heating apparatus.

From the above mentioned, according to a temperature controller of an electromagnetic induction heating apparatus concerning the present invention, a high frequency electric current generator does not drive recklessly even when a temperature of a heating element reaches in the vicinity of a magnetic transformation temperature.

Therefore, it is suitable as a temperature controller of an electromagnetic induction heating apparatus.

According to a starting method of electromagnetic induction heating apparatus concerning the present invention, an electric current is limited and a static fluid is preheated then a zero-starting is performed even when a temperature of a heating element reaches in the vicinity of a magnetic transformation temperature. Therefore, it is suitable as a starting method of electromagnetic induction heating apparatus.

We claim:

1. A temperature controller used for an electromagnetic induction heating apparatus provided with a heating element made of magnetic material and prepared in a fluid passage, a coil prepared in a perimeter of the heating element and a high frequency electric current generator for the coil, said electromagnetic induction heating apparatus having a magnetic transformation temperature where a degree of magnetism decreases when temperature of a magnetic material of the heating element becomes high, said temperature controller, comprising:
an electric current detection device measuring an electric current flowing from the high frequency electric current generator to the coil and detecting that a temperature of magnetic material forming the heating element having a temperature reaching in the vicinity of the magnetic transformation temperature; and
an electric current restrictive device limiting the electric current flowing to the coil based on said electric current detection device.

2. The temperature controller as claimed in claim 1, wherein said electric current restrictive device outputs the high frequency electric current generator down when the electric current flowing through the coil reaches a required value and outputs the high frequency electric current generator up when the heating element is cooled.

3. The temperature controller as claimed in claim 1, wherein said electric current restrictive device maintains a required value of an electric current when a value of an electric current flowing through the coil reaches the required value.

4. A temperature controller used for an electromagnetic induction heating apparatus provided with a heating element made of magnetic material and prepared in a fluid passage, a coil prepared in a perimeter of the heating element and a high frequency electric current generator for the coil, said electromagnetic induction heating apparatus having a magnetic transformation temperature where a degree of magnetism decreases when temperature of a magnetic material of the heating element becomes high, said temperature controller, comprising:
a temperature regulator measuring a fluid temperature at the side of outlet of the fluid passage and outputting an instruction corresponding to a difference between the measured temperature and a required temperature so that the measured temperature can coincide with the required temperature;
an electric current controlling device controlling an output of the high frequency electric current generator based on said instruction from said temperature regulator;
an electric current restrictive device measuring an electric current flowing from the high frequency electric current generator to the coil and detecting that a temperature of magnetic material forming the heating element having a temperature reaching in the vicinity of the magnetic transformation temperature; and
an electric current restrictive device outputting an instruction of limiting the electric current flowing through the coil to said electric current controlling device based on said electric current detection device to take precedence of the instruction of the temperature regulator.

5. The temperature controller as claimed in claim 4, wherein said electric current restrictive device outputs an instruction toward said electric current controlling device during a required time when an electric current detection device detects an electric current exceeding a required value, said instruction is making an output of the high frequency electric current generator down.

6. A temperature controller used for an electromagnetic induction heating apparatus provided with a heating element made of magnetic material and prepared in a fluid passage, a coil prepared in a perimeter of the heating element and a high frequency electric current generator for the coil, said electromagnetic induction heating apparatus having a magnetic transformation temperature where a degree of magnetism decreases when temperature of a magnetic material of the heating element becomes high, said temperature controller, comprising:
a temperature regulator measuring a fluid temperature at the side of outlet of the fluid passage and outputting an instruction corresponding to a difference between the measured temperature and a required temperature so that the measured temperature can coincide with the required temperature;
an electric current detection device measuring an electric current flowing from the high frequency electric current generator to the coil and detecting a temperature of magnetic material forming the heating element reaches approximately the magnetic transformation temperature;

an electric current controlling device controlling an output of the high frequency electric current generator based on said instruction from said temperature regulator or said electric current detection device; and an electric current restrictive device connected with said temperature regulator, said electric current detection device and said electric current controlling device output to an instruction for limiting the electric current flowing through the coil to said electric current controlling device based on said electric current detection device to take precedence of the instruction of the temperature regulator.

7. The temperature controller as claimed in claim 6, wherein said electric current restrictive device has a comparator outputting an instruction for limiting the electric current flowing through the coil to said electric current controlling device based on said electric current detection device to take precedence of the instruction of the temperature regulator.

8. A method of starting an electromagnetic induction heating apparatus provided with a heating element made of magnetic material and prepared in a fluid passage, a coil prepared in a perimeter of the heating element, a high frequency electric current generator for the coil and a temperature regulator for measuring a fluid temperature at the side of outlet of the fluid passage and adjusting an output of the high frequency electric current generator, said electromagnetic induction heating apparatus having a magnetic transformation temperature where a degree of magnetism decreases when temperature of a magnetic material of the heating element becomes high, said method comprising:

filling the fluid passage with a fluid to keep the heating element in the static fluid;

flowing the electric current from the high frequency electric current generator to the coil to set a required temperature in the temperature regulator;

preheating the heating element and the fluid with limiting the electric current and taking precedence of an instruction of the temperature regulator when a temperature of the magnetic material forming the heating element reaches a temperature in the vicinity of a magnetic transformation and the electric current flowing through the coil increases; and starting the electromagnetic induction heating apparatus to flow out the fluid from the fluid passage.

9. The method as claimed in claim 8, wherein, in said preheating, an output of the high frequency electric current generator is made down when the electric current flowing through the coil reaches a required value and the output of the high frequency electric current generator is made up again when the heating element is cooled, and the electric current are limited by a repetition of these functions.

10. The method as claimed in claim 8, wherein, in said preheating, an electric current is limited so that a required value of an electric current may be maintained when a value of an electric current flowing through the coil reaches on the required value.

11. A temperature controller for use in an electromagnetic induction heating apparatus having a heating element, comprising:

an electric current detection device detecting a rise in temperature in the vicinity of a magnetic transformation temperature of a magnetic material forming the heating element where a degree of magnetism decreases when temperature of a magnetic material of the heating element becomes high; and an electric current restrictive device limiting the electric current flowing to a coil based on the electric current detection device.

12. A method of controlling the temperature in an electromagnetic induction heating apparatus having a heating element, comprising:

detecting a rise in temperature in the vicinity of a magnetic transformation temperature of a magnetic material forming the heating element where a degree of magnetism decreases when temperature of a magnetic material of the heating element becomes high; and limiting the electric current flowing to a coil based on the electric current detection device.

* * * * *